United States Patent
Inui et al.

(10) Patent No.: US 12,380,708 B2
(45) Date of Patent: Aug. 5, 2025

(54) PARKING ASSISTANCE DEVICE

(71) Applicant: AISIN CORPORATION, Kariya (JP)

(72) Inventors: Yoji Inui, Kariya (JP); Shota Sobue, Kariya (JP); Masaki Furukawa, Kariya (JP); Naoki Yamamura, Kariya (JP); Yuya Shimohira, Kariya (JP); Masataka Yamamoto, Kariya (JP); Ryutaro Kato, Kariya (JP)

(73) Assignee: AISIN CORPORATION, Kariya (JP)

( * ) Notice: Subject to any disclaimer, the term of this patent is extended or adjusted under 35 U.S.C. 154(b) by 459 days.

(21) Appl. No.: 17/065,972

(22) Filed: Oct. 8, 2020

(65) Prior Publication Data
US 2021/0110179 A1 Apr. 15, 2021

(30) Foreign Application Priority Data
Oct. 11, 2019 (JP) ................... 2019-188129

(51) Int. Cl.
*G06V 20/58* (2022.01)
*B60W 30/00* (2006.01)
*G06V 20/56* (2022.01)
*G08G 1/14* (2006.01)
*H04N 23/90* (2023.01)

(52) U.S. Cl.
CPC .......... *G06V 20/586* (2022.01); *B60W 30/00* (2013.01); *G06V 20/588* (2022.01); *G08G 1/143* (2013.01); *H04N 23/90* (2023.01)

(58) Field of Classification Search
CPC ... G06V 20/586; G06V 20/588; B60W 30/00; G08G 1/143; H04N 5/247
See application file for complete search history.

(56) References Cited

U.S. PATENT DOCUMENTS

| | | | |
|---|---|---|---|
| 9,283,960 B1* | 3/2016 | Lavoie ................. | B60W 30/06 |
| 9,522,675 B1* | 12/2016 | You ...................... | B60W 30/06 |
| 10,346,694 B2 | 7/2019 | Irie et al. | |
| 10,896,336 B2 | 1/2021 | Yamamoto et al. | |
| 11,420,679 B2 | 8/2022 | Ohtani et al. | |
| 2016/0203377 A1 | 7/2016 | Irie et al. | |
| 2019/0225267 A1 | 7/2019 | Ohtani et al. | |
| 2019/0392229 A1* | 12/2019 | Yamamoto ........... | G06V 20/586 |
| 2020/0001864 A1* | 1/2020 | Oyama ................. | B60W 10/20 |
| 2020/0380276 A1* | 12/2020 | Kaneko ................ | G06V 10/457 |
| 2020/0391727 A1* | 12/2020 | Park ....................... | B62D 1/00 |
| 2021/0001837 A1 | 1/2021 | Hirakawa et al. | |

FOREIGN PATENT DOCUMENTS

| | | |
|---|---|---|
| JP | 2013-154730 A | 8/2013 |
| JP | 2015-79421 A | 4/2015 |
| JP | 2016-016681 A | 2/2016 |
| JP | 2019-015570 A | 1/2019 |
| JP | 2019-128643 A | 8/2019 |
| JP | 2020-4368 A | 1/2020 |
| WO | 2019/159575 A1 | 8/2019 |

* cited by examiner

*Primary Examiner* — Benjamin C Lee
*Assistant Examiner* — Nathan P Brittingham
(74) *Attorney, Agent, or Firm* — Sughrue Mion, PLLC

(57) ABSTRACT

A parking assistance device that recognizes a parking stall where a vehicle is to be parked, includes: at least three cameras that take images of an outside of the vehicle; a setting unit that sets, based on a preset setting condition, a camera which is to take an image used for recognizing the parking stall; and a detection unit that detects the parking stall based on the image taken by the set camera.

4 Claims, 3 Drawing Sheets

| | | FRONT-SIDE CAMERA | REAR-SIDE CAMERA | LEFT-SIDE CAMERA | RIGHT-SIDE CAMERA |
|---|---|---|---|---|---|
| (1) | BACKWARD ENTRANCE INTO PARKING STALL FOR PERPENDICULAR PARKING | — | O | O | O |
| (2) | FORWARD ENTRANCE INTO PARKING STALL FOR PERPENDICULAR PARKING | O | — | O | O |
| (3) | BACKWARD ENTRANCE INTO PARKING STALL FOR PARALLEL PARKING | O | O | O | O |
| (4) | FORWARD ENTRANCE INTO PARKING STALL FOR PARALLEL PARKING | O | O | O | O |
| (5) | FORWARD PULLING OUT FROM PARKING STALL FOR PERPENDICULAR PARKING | O | — | O | O |
| (6) | BACKWARD PULLING OUT FROM PARKING STALL FOR PERPENDICULAR PARKING | — | O | O | O |
| (7) | FORWARD PULLING OUT FROM PARKING STALL FOR PARALLEL PARKING | O | O | O | O |
| (8) | BACKWARD PULLING OUT FROM PARKING STALL FOR PARALLEL PARKING | O | O | O | O |

FIG.4A
LEFT-RIGHT SEARCH MODE

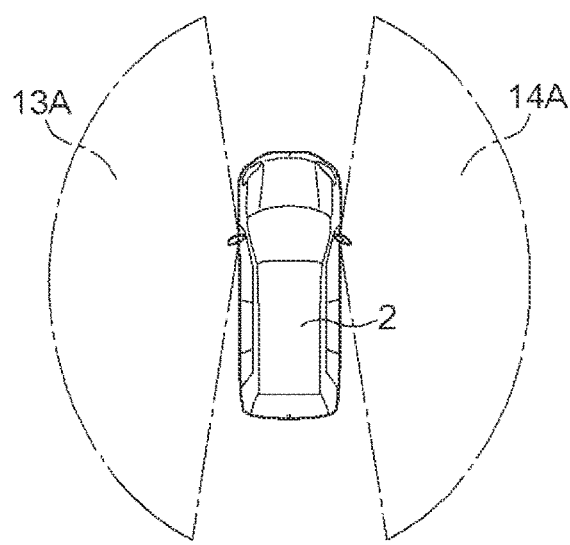

FIG.4B
OMNIDIRECTIONAL SEARCH MODE

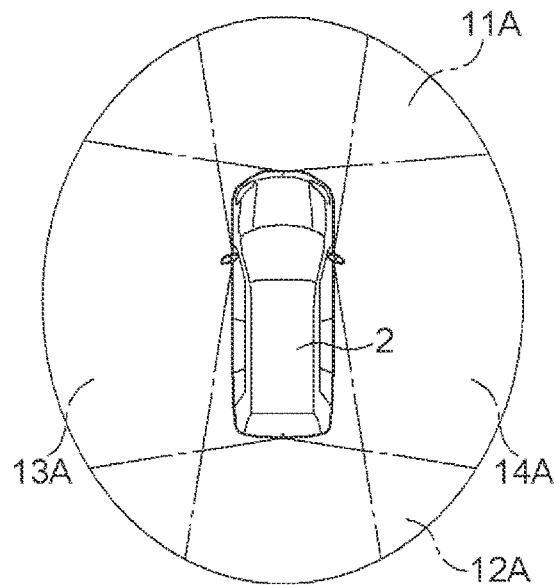

FIG.5

| | | FRONT-SIDE CAMERA | REAR-SIDE CAMERA | LEFT-SIDE CAMERA | RIGHT-SIDE CAMERA |
|---|---|---|---|---|---|
| (1) | BACKWARD ENTRANCE INTO PARKING STALL FOR PERPENDICULAR PARKING | – | O | O | O |
| (2) | FORWARD ENTRANCE INTO PARKING STALL FOR PERPENDICULAR PARKING | O | – | O | O |
| (3) | BACKWARD ENTRANCE INTO PARKING STALL FOR PARALLEL PARKING | O | O | O | O |
| (4) | FORWARD ENTRANCE INTO PARKING STALL FOR PARALLEL PARKING | O | O | O | O |
| (5) | FORWARD PULLING OUT FROM PARKING STALL FOR PERPENDICULAR PARKING | O | – | O | O |
| (6) | BACKWARD PULLING OUT FROM PARKING STALL FOR PERPENDICULAR PARKING | – | O | O | O |
| (7) | FORWARD PULLING OUT FROM PARKING STALL FOR PARALLEL PARKING | O | O | O | O |
| (8) | BACKWARD PULLING OUT FROM PARKING STALL FOR PARALLEL PARKING | O | O | O | O |

PARKING ASSISTANCE DEVICE

CROSS REFERENCE TO RELATED APPLICATIONS

This application is based on and claims priority under 35 U.S.C. § 119 to Japanese Patent Application 2019-188129, filed on Oct. 11, 2019, the entire content of which is incorporated herein by reference.

TECHNICAL FIELD

This disclosure relates to a parking assistance device that recognizes a parking stall where a vehicle is to be parked.

BACKGROUND DISCUSSION

In the related art, during parking of a vehicle, a parking assistance device that assists a parking operation in order to reduce a burden on a driver is used. Assistance of such a parking operation includes detection assistance of detecting parking stalls where a vehicle can be parked, setting assistance of setting a target parking stall where an own vehicle is to be parked from the detected parking stalls, start position guidance assistance of guiding the vehicle to a parking start position to start parking, and parking position guidance assistance of guiding the vehicle from the parking start position to the target parking stall. During this series of assistance, it is important to recognize the parking stall. As a technique for recognizing such a parking stall, for example, JP 2019-15570A (Reference 1) is shown below.

Reference 1 describes a parking position information acquisition device that recognizes a position of a parking frame line for an own vehicle based on an image of an in-vehicle camera. The parking position information acquisition device detects an image of the parking frame line from a camera image taken by a camera provided on a side of the vehicle, and calculates the position of the parking frame line with respect to a position of the camera. Further, a position of the vehicle with respect to the position of the parking frame line is calculated as a self-position.

The technique described in Reference 1 configured as described above is used to calculate, as the self-position, the position of the parking frame line obtained based on camera image information when the image of the parking frame line is closer to a center within an area of the camera image. Here, depending on a situation, a case of parking the vehicle in a parking stall located in front of the vehicle is also assumed. Since the technique described in Reference 1 utilizes the cameras provided on the lateral sides of the vehicle as described above, it is possible to appropriately recognize the parking stalls on both sides of the vehicle, but it is not assumed to recognize the parking stall in front of the vehicle. Therefore, for example, it is not easy to recognize the parking stall in front of the vehicle where the vehicle moves forward to enter, and it takes time to recognize the parking stall.

A need thus exists for a parking assistance device which is not susceptible to the drawback mentioned above.

SUMMARY

According to a characteristic configuration of a parking assistance device according to this disclosure, the parking assistance device that recognizes a parking stall where a vehicle is to be parked includes: at least three cameras that take images of the outside of the vehicle; a setting unit that sets, based on a preset setting condition, a camera which is to take an image used for recognizing the parking stall; and a detection unit that detects the parking stall based on the image taken by the set camera.

BRIEF DESCRIPTION OF THE DRAWINGS

The foregoing and additional features and characteristics of this disclosure will become more apparent from the following detailed description considered with the reference to the accompanying drawings, wherein:

FIG. 4A is a diagram illustrating a left-right search mode and FIG. 4B is a diagram illustrating an omnidirectional search mode; and FIG. 5 is a table showing relationships between parking and pulling out modes and cameras whose captured image is to be used.

DETAILED DESCRIPTION

A parking assistance device according to this disclosure is configured to appropriately recognize a parking stall where a vehicle is to be parked, regardless of a traveling condition of the vehicle. Here, the parking stall in the present embodiment is a space that is defined by a marking line such that each vehicle can be parked in a parking lot or the like, for example. The marking line is an index or an object provided on a road surface (ground). Specifically, the marking line corresponds to an index such as a line attached to the road surface, a block, a curb, a hedge, or the like (hereinafter referred to as a "block, or the like"). Therefore, the parking stall corresponds to a space that is defined by the index or the object provided on the road surface in order to park each vehicle in the parking lot or the like. The parking assistance device is configured to appropriately recognize the parking stall defined by such an index or block, or the like. Hereinafter, a parking assistance device 1 of the present embodiment will be described.

Figure 1:
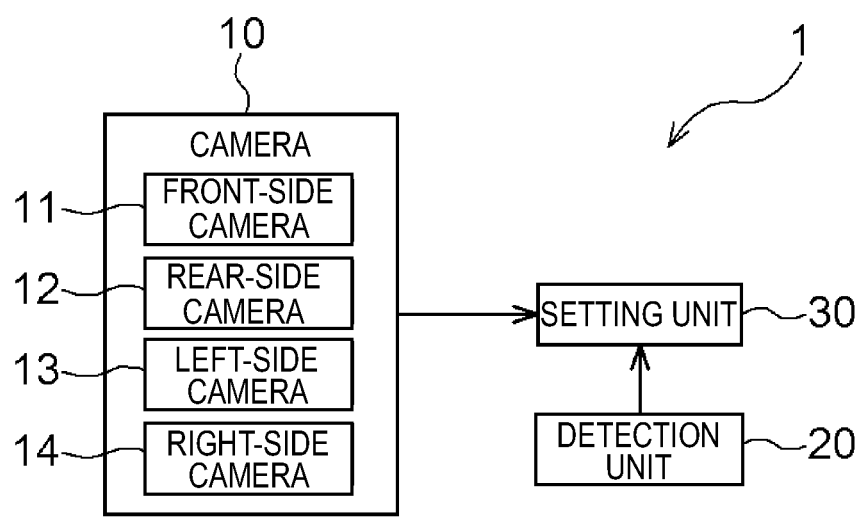
FIG. 1 is a block diagram showing a configuration of a parking assistance device.

FIG. 1 is a block diagram showing a configuration of the parking assistance device 1 according to the present embodiment. As shown in FIG. 1, the parking assistance device 1 includes functional units of cameras 10, a setting unit 20, and a detection unit 30. Each of these functional units is constructed by hardware, software, or both with a CPU as a core member in order to perform processing related to recognition of the parking stall.

Figure 2:
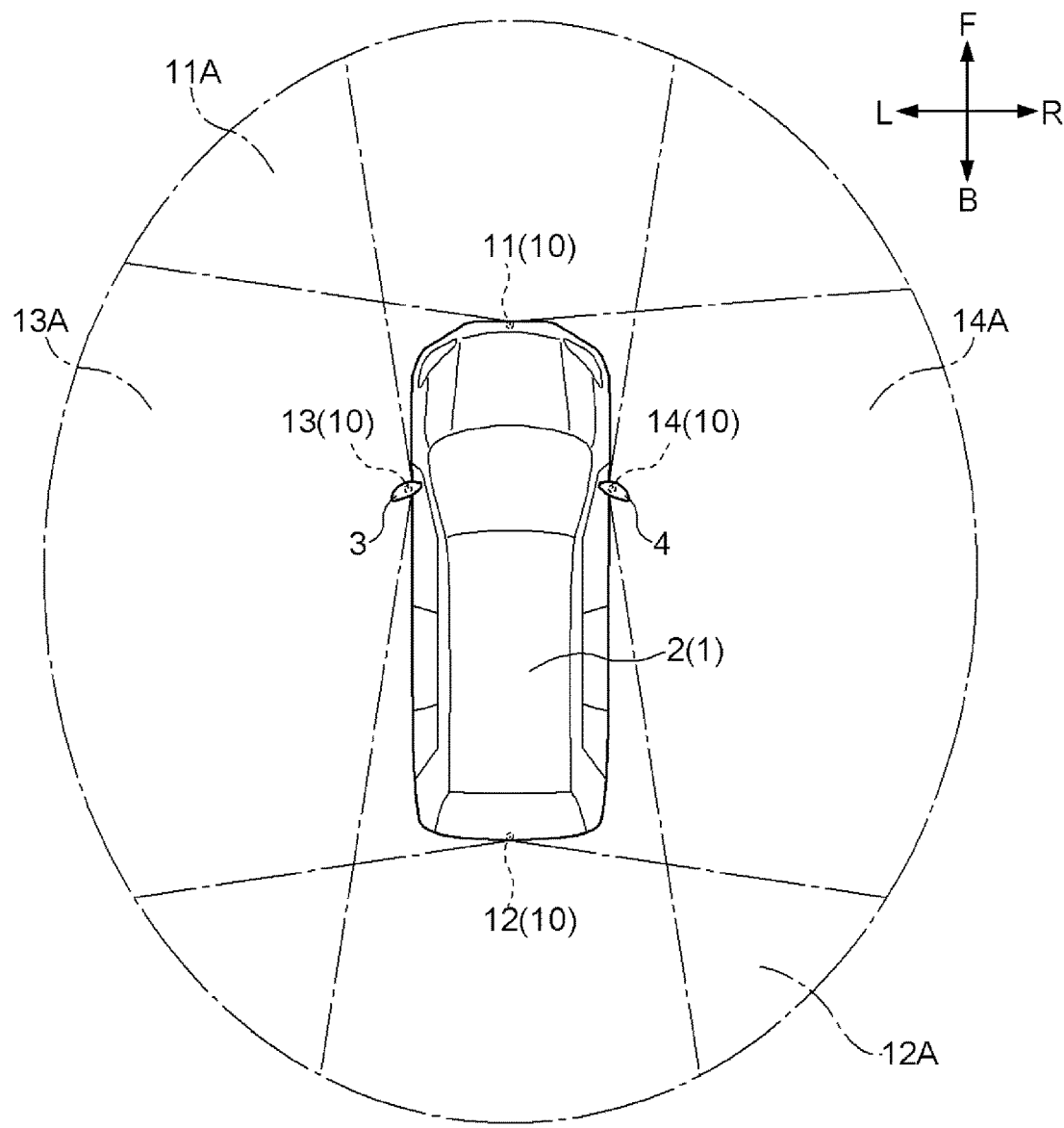
FIG. 2 is a schematic diagram of a vehicle provided with the parking assistance device.

FIG. 2 is a schematic diagram of a vehicle 2 on which the parking assistance device 1 is mounted. Here, in order to facilitate understanding, in the present embodiment, unless otherwise specified, a term "front" (a direction indicated by an arrow F shown in FIG. 1) means the front in a front-rear direction (a travelling direction) of the vehicle 2, and a term "rear" (a direction indicated by an arrow B shown in FIG. 1) means the rear in the front-rear direction (the travelling direction) of the vehicle 2. Further, a left-right direction or a lateral direction means a transverse direction (a vehicle width direction) of the vehicle 2 orthogonal to the front-rear direction of the vehicle 2, that is, a term "left" (a direction indicated by an arrow L shown in FIG. 2) and a term "right" (a direction indicated by an arrow R shown in FIG. 2) mean a left direction and a right direction of the vehicle 2, respectively.

As shown in FIG. 2, at least three cameras 10 are provided in the vehicle 2. In the present embodiment, four cameras 10 are provided in the vehicle 2. Specifically, a front-side camera 11 is provided at a center of a front end (for example, a front grill) of the vehicle 2, and a rear-side camera 12 is provided at a center of a rear end (for example, a garnish) of the vehicle 2. Further, a left-side camera 13 is provided at a left-side end portion (for example, a left-side mirror 3) of the vehicle 2, and a right-side camera 14 is provided at a right-side end portion (for example, a right-side mirror 4) of the vehicle 2. Hereinafter, when the cameras 11 to 14 are not distinguished from one another, the cameras 11 to 14 are collectively referred to as the cameras 10, and when the cameras 11 to 14 are distinguished from one another, respective reference numerals will be used for description.

The cameras 10 take images of the outside of the vehicle 2. The front-side camera 11 takes an image of a scene in an imaging range (a front-side imaging range 11A) that is set to include a road surface in front of the vehicle 2. The rear-side camera 12 takes an image of a scene in an imaging range (a rear-side imaging range 12A) that is set to include a road surface behind the vehicle 2. The left-side camera 13 takes an image of a scene in an imaging range (a left-side imaging range 13A) that is set to include a road surface on a left side as seen in the travelling direction of the vehicle 2. The right-side camera 14 takes an image of a scene in an imaging range (a right-side imaging range 14A) that is set to include a road surface on a right side of the vehicle 2. It is preferable that the cameras 11 to 14 are set such that the imaging ranges of the cameras adjacent to each other in a peripheral direction of the vehicle 2 overlap each other so as to reduce an area of a blind spot.

In the present embodiment, the camera 10 takes the image of the outside of the vehicle 2 through a fisheye lens. Therefore, a captured image in the present embodiment is a so-called fisheye image. The images taken by the cameras 10 are transmitted as image data to the detection unit 30 which will be described later.

The setting unit 20 sets, based on a preset setting condition, the cameras 10 that take images used for recognizing a parking stall. The parking assistance device 1 is configured to select captured images to be recognized (used for recognition processing) according to a situation of the vehicle 2 in order to recognize the parking stall smoothly and appropriately. In the present embodiment, conditions for selecting such captured images are preset as the setting conditions according to the situation of the vehicle 2, and are stored in the setting unit 20. The "captured images used for recognizing the parking stall" are captured images used by the detection unit 30, which will be described later, to detect the parking stall.

Figure 3:
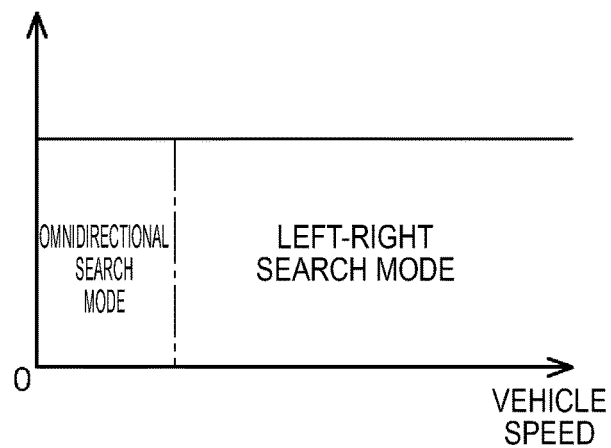
FIG. 3 shows an example of a setting condition.

For example, it is possible to set the setting conditions according to a vehicle speed of the vehicle 2. Here, in a case of parking the vehicle 2, the vehicle 2 is often parked in a parking stall that is arranged along the travelling direction of the vehicle 2 (arranged parallel to the travelling direction). Further, in a situation where such a parking stall is searched for, the speed of the vehicle 2 is often faster than that during parking of the vehicle 2 to the parking stall. Therefore, when the vehicle speed is equal to or higher than a preset speed, the setting unit 20 sets the left-side camera 13 and the right-side camera 14 as the cameras 10 that take the images used for recognizing the parking stall. Accordingly, it is possible to secure detection accuracy of the parking stall on the left side and the right side of the vehicle 2 in a left-right search mode and meet needs of an occupant (see FIG. 3), and for example, it is possible to improve convenience for most frequently used backward entrance into the parking stall in which the vehicle 2 is moved backward and parked in the parking stall.

On the other hand, in a situation where it is difficult to find a parking stall for parking the vehicle 2, when it is finally necessary to find a parking stall, it is more efficient to search for a parking stall arranged not only along the travelling direction of the vehicle 2 (arranged parallel to the travelling direction), but also around the vehicle 2. Further, in such a situation, the speed of the vehicle 2 is often reduced to search for the parking stall. Therefore, when the vehicle speed is lower than the preset speed, the setting unit 20 sets the front-side camera 11, the rear-side camera 12, the left-side camera 13 and the right-side camera 14 as the cameras 10 that take the images used for recognizing the parking stall. Accordingly, by recognizing the parking stall in an omnidirectional search mode in which all four cameras 10 are used, not only the marking lines on the left side and the right side of the vehicle 2 but also the marking lines on the front and rear sides of the vehicle 2 can be detected, and the parking stall can be recognized (see FIG. 3), which enables a forward entrance into the parking stall while assisting the parking operation.

Therefore, the setting unit 20 can set the cameras 10 to the left-right search mode (an example of a "first mode") in which both lateral sides of the vehicle 2 are set as detection areas of the parking stall, and the omnidirectional search mode (an example of a "second mode") in which the both lateral sides and other areas (in the present embodiment, areas in the front-rear direction) different from the both lateral sides are set as the detection areas. FIG. 4A shows a situation of the left-right search mode in which the left-side imaging range 13A of the left-side camera 13 and the right-side imaging range 14A of the right-side camera 14 of the vehicle 2 are set as the detection areas of the parking stall. FIG. 4B shows a situation of the omnidirectional search mode in which the front-side imaging range 11A of the front-side camera 11, the rear-side imaging range 12A of the rear-side camera 12, the left-side imaging range 13A of the left-side camera 13 and the right-side imaging range 14A of the right-side camera 14 of the vehicle 2 are set as the detection areas of the parking stall.

The setting conditions can also be set according to a parking mode in which the vehicle 2 is parked into the parking stall and a pulling out mode in which the vehicle 2 is pulled out from the parking stall. The parking mode in which the vehicle 2 is parked into the parking stall is a type of parking the vehicle 2 into the parking stall, and corresponds to (1) backward entrance into the parking stall for perpendicular parking, in which the vehicle 2 is moved backward for the perpendicular parking, (2) forward entrance into the parking stall for perpendicular parking, in which the vehicle 2 is advanced for the perpendicular parking, (3) backward entrance into the parking stall for parallel parking, in which the vehicle 2 is moved backward for the parallel parking, and (4) forward entrance into the parking stall for parallel parking, in which the vehicle 2 is advanced for the parallel parking. The pulling out mode in which the vehicle 2 is pulled out from the parking stall is a type of pulling out the vehicle 2 from the parking stall, and corresponds to (5) forward pulling out from the parking stall for perpendicular parking, in which the vehicle 2 that is parked in the perpendicular parking is advanced and pulled out from the parking stall, (6) backward pulling out from the parking stall for perpendicular parking, in which the vehicle 2 that is parked in the perpendicular parking is moved backward and pulled out from the parking stall, (7) forward pulling out from the parking stall for parallel parking, in which the vehicle 2 that is parked in the parallel parking is advanced and pulled out from the parking stall, and (8) backward pulling out from the parking stall for parallel parking, in which the vehicle 2 that is parked in the parallel parking is moved backward and pulled out from the parking stall.

FIG. 5 shows an example of setting the cameras 10, that take the images used for recognizing the parking stall, according to the above parking mode and the pulling out mode. For example, in the example of FIG. 5, in (1) the backward entrance into the parking stall for perpendicular parking, images taken by the rear-side camera 12, the left-side camera 13, and the right-side camera 14 are set to be used, in (2) the forward entrance into the parking stall for perpendicular parking, images taken by the front-side camera 11, the left-side camera 13 and the right-side camera 14 are set to be used, in (3) the backward entrance into the parking stall for parallel parking, images taken by the front-side camera 11, the rear-side camera 12, the left-side camera 13 and the right-side camera 14 are set to be used, and in (4) the forward entrance into the parking stall for parallel parking, images taken by the front-side camera 11, the rear-side camera 12, the left-side camera 13 and the right-side camera 14 are set to be used.

In (5) the forward pulling out from the parking stall for perpendicular parking, images taken by the front-side camera 11, the left-side camera 13 and the right-side camera 14 are set to be used, in (6) the backward pulling out from the parking stall for perpendicular parking, images taken by the rear-side camera 12, the left-side camera 13 and the right-side camera 14 are set to be used, in (7) the forward pulling out from the parking stall for parallel parking, images taken by the front-side camera 11, the rear-side camera 12, the left-side camera 13 and the right-side camera 14 are set to be used, and in (8) the backward pulling out from the parking stall for parallel parking, images taken by the front-side camera 11, the rear-side camera 12, the left-side camera 13 and the right-side camera 14 are set to be used. Of course, the setting conditions shown in FIG. 5 are examples and a setting condition different from those in FIG. 5 can also be set.

The setting unit 20 sets, based on such setting conditions, the cameras 10 that take the images used for recognizing the parking stall. The "setting, . . . , the cameras 10 that take the images used for recognizing the parking stall" means "setting, . . . , the cameras 10 that take the images used for recognizing the parking stall among the cameras 10", and means "setting the images used for recognizing the parking stall among the images taken by the cameras 10" in the present embodiment. A setting result of the setting unit 20 is transmitted to at least the detection unit 30 which will be described later.

The detection unit 30 detects the parking stall based on the images taken by the set cameras 10. For the images taken by the set cameras 10, the cameras 10 are set by the setting unit 20. Here, the detection unit 30 may be configured such that captured images (image data) of only the cameras 10 that are set by the setting unit 20 are transmitted to the detection unit 30, and can also be configured such that captured images (the image data) of all the cameras 10 are transmitted to the detection unit 30 and the detection unit 30 uses only the captured images (the image data) transmitted from the cameras 10 that are set by the setting unit 20 to detect the parking stall. The camera 10 that is not set by the setting unit 20 may be configured to stop an imaging state, or may be configured to continuously take images. When the imaging state of the camera 10 that is not set by the setting unit 20 is configured to be stopped, it is preferable to transmit the setting result of the setting unit 20 to the camera 10 and stop the imaging state based on the setting result.

In a case of detecting the parking stall, the detection unit 30 can be configured to first detect the marking line that defines the parking stall and then detect the parking stall based on the marking line. Such a marking line can be detected by using a known method. Specifically, the detection unit 30 sets a detection area to be used as an area for detecting an end portion of the marking line along the road surface included in the images taken by the cameras 10 that are set by the setting unit 20. It is preferable that the detection area is set longer than a vehicle length along a vehicle length direction of the vehicle 2 and longer than a vehicle width along a vehicle width direction of the vehicle 2. The detection unit 30 detects an end portion of the index such as the marking line or the block or the like in the detection area set on the captured images. Although detailed description is omitted, for example, in the detection area, detection is possible by performing edge detection based on known edge extraction, and determining whether there is the index, block, or the like based on the detected edge.

As described above, the parking assistance device 1 sets the cameras 10 that take the images used for recognizing the parking stall to recognize the parking stall. Accordingly, since the captured images corresponding to the situation of the vehicle 2 can be used, recognition accuracy can be improved and a recognition speed can also be improved. Therefore, since the parking stall can be recognized quickly and appropriately, parking assistance can be smoothly performed.

Other Embodiments

In the above embodiment, an example in which four cameras 10 are provided is described, but it is sufficient as long as at least three cameras 10 are provided in the vehicle 2. That is, the three cameras 10 may be provided in the vehicle 2, or five or more cameras 10 may be provided. In either case, the left-side camera 13 and the right-side camera 14 need to be provided.

Although it has been described in the above embodiment that the setting conditions are set according to the vehicle speed of the vehicle 2, but the setting conditions can be set regardless of the vehicle speed of the vehicle 2.

Although it has been described in the above embodiment that the detection unit 30 detects the marking line that defines the parking stall, the detection unit 30 may be configured to directly detect the parking stall instead of detecting the parking stall based on the marking line.

Although it has been described in the above embodiment that the setting conditions are set according to the parking mode in which the vehicle 2 is parked in the parking stall and the pulling out mode in which the vehicle 2 is pulled out from the parking stall, the setting conditions can also be set only according to the parking mode in which the vehicle 2 is parked in the parking stall, or can also be set only according to the pulling out mode in which the vehicle 2 is pulled out from the parking stall. The setting conditions can also be set regardless of the parking mode or the pulling out mode.

In above embodiment, it has been described that the setting unit 20 can set the cameras 10 to the left-right search mode (the first mode) in which the both lateral sides of the vehicle 2 are set as the detection areas of the parking stall, and the omnidirectional search mode (the second mode) in which the both lateral sides and other areas different from the both lateral sides are set as the detection areas. For example, the first mode may be set as the left-right search mode, and the second mode can also be configured such that the left and right sides and the front side of the vehicle 2 are set as the detection areas, or the left and right sides and the rear side are set as the detection areas, instead of an entire periphery of the vehicle 2 being set as the detection areas.

This disclosure can be used in a parking assistance device that recognizes a parking stall where a vehicle is to be parked.

According to a characteristic configuration of a parking assistance device according to this disclosure, the parking assistance device that recognizes a parking stall where a vehicle is to be parked includes: at least three cameras that take images of the outside of the vehicle; a setting unit that sets, based on a preset setting condition, a camera which is to take an image used for recognizing the parking stall; and a detection unit that detects the parking stall based on the image taken by the set camera.

According to such a characteristic configuration, the captured image used for detecting the parking stall can be set based on the setting condition, and a calculation load related to the detection of the parking stall can be reduced and detection accuracy can be improved as needed. Therefore, for example, by setting the setting condition according to a situation of the vehicle, it is possible to appropriately recognize the parking stall according to the situation of the vehicle.

It is preferable that the setting condition is set according to a vehicle speed of the vehicle.

According to such a configuration, the captured image used for detecting the parking stall can be set according to the vehicle speed of the vehicle.

It is preferable that the detection unit detects a marking line that defines the parking stall.

According to such a configuration, since the parking stall can be detected based on the marking line, the detection accuracy of the parking stall can be improved. Therefore, the parking stall can be recognized more appropriately.

It is preferable that the setting condition is set according to a parking mode in which the vehicle is parked into the parking stall and a pulling out mode in which the vehicle is pulled out from the parking stall.

When the vehicle is parked in the parking stall or when the vehicle is pulled out from the parking stall, a part of the parking stall to be noted differs depending on the situation. Therefore, according to such a configuration, since the captured image used for detecting the parking stall is set according to the parking mode or the pulling out mode of the vehicle, the part of the parking stall to be noted according to the situation can be recognized.

It is preferable that the setting unit is able to be set the cameras to a first mode in which both lateral sides of the vehicle are set as detection areas of the parking stall, and a second mode in which the both lateral sides and other areas different from the both lateral sides are set as detection areas.

According to such a configuration, by setting the cameras to the first mode in a case of detecting the parking stalls on both lateral sides of the vehicle, and setting the cameras to the second mode in a case of detecting the parking stalls in other areas together with the both lateral sides of the vehicle, it is possible to perform detection corresponding to the situation of the vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking assistance device that recognizes a parking stall where a vehicle is to be parked, comprising:
   at least four cameras that take images of the outside of the vehicle;
   a setting unit that sets, based on a preset setting condition, a camera which is to take an image used for recognizing the parking stall; and
   a detection unit that detects the parking stall based on the image taken by the set camera,
   wherein the at least four cameras include a front-side camera configured to capture an image of a front side of the vehicle, a rear-side camera configured to capture an image of a rear side of the vehicle, a left-side camera that captures an image of a left side of the vehicle, and a right-side camera that captures an image of a right side of the vehicle,
   wherein the setting condition is set according to a parking mode in which the vehicle is to be parked into the parking stall and a pulling out mode in which the vehicle is to be pulled out from the parking stall, and
   the parking mode characterized by a left-side imaging range of the left-side camera, a right-side imaging range of the right-side camera, and one of a front-side imaging range by the front side camera or a rear-side imaging range by the rear-side camera are correspondingly set as a detection area of the parking stall for a respective forward or backward entrance perpendicular parking; and
   the front-side imaging range by the front-side camera, the rear-side imaging range by the rear-side camera, the left-side imaging range by the left-side camera, and the right-side imaging range by the right-side camera are set as the detection area of the parking stall for backward and forward entrance parallel parkings;
   the pulling out mode characterized by the front-side imaging range by the front-side camera, the rear-side imaging range by the rear-side camera, the left-side imaging range by the left-side camera, and the right-side imaging range by the right-side camera are set as the detection area of the parking stall for forward and backward pulling out parallel parkings, and
   the left-side imaging range by the left-side camera, the right-side imaging range by the right-side camera, and one of the front-side imaging range by the front-side camera or the rear-side imaging range by the rear-side camera are correspondingly set as a detection area of the parking stall for a respective forward or backward pulling out perpendicular parking.

2. The parking assistance device according to claim 1, wherein the setting condition is set according to a vehicle speed of the vehicle.

3. The parking assistance device according to claim 1, wherein the detection unit detects a marking line that defines the parking stall.

4. The parking assistance device according to claim 1, wherein the setting unit is further configured to set the cameras to a first left-right search mode in which both lateral sides of the vehicle are set as detection areas of the parking stall, and a second omnidirectional search mode in which the both lateral sides and other areas different from the both lateral sides are set as detection areas.

* * * * *